Patented Nov. 10, 1953

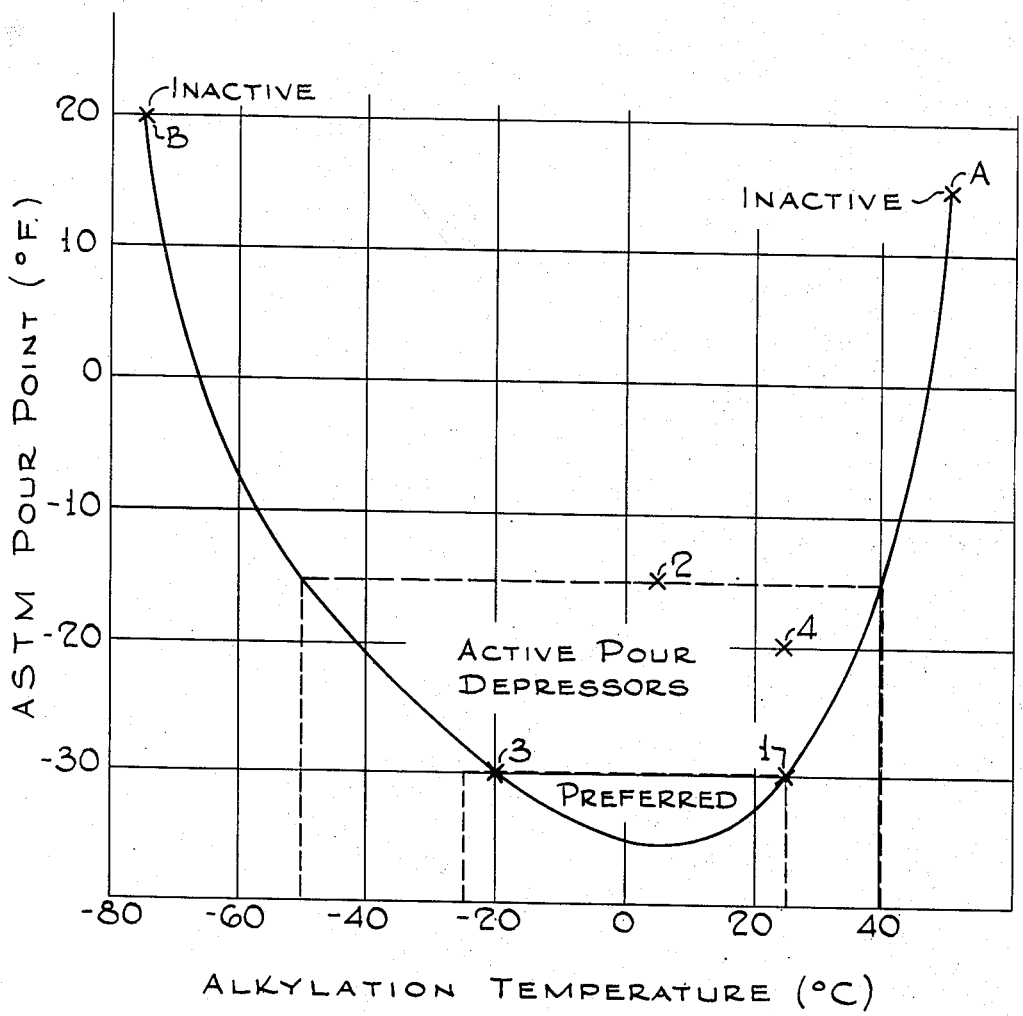

2,658,872

UNITED STATES PATENT OFFICE 2,658,872

MODIFIED COPOLYMERS AND PREPARATION AND USES THEREOF

William C. Hollyday, Jr., Fanwood, and Marvin H. Mahan, Roselle, N. J., assignors to Standard Oil Development Company, a corporation of Delaware Application March 5, 1949, Serial No. 79,872

16 Claims. (Cl. 252—59)

This invention relates to novel modified copolymer products and to methods of preparing and using same, and more particularly it relates to making and using novel alkylated derivatives of high molecular weight copolymers containing an aromatic nucleus, of which a styrene-isobutylene copolymer of certain characteristics, as will be explained more fully hereinafter, is one example. A purpose of this invention is to use these novel products in lubricating oil and other oils in such concentrations as to lower the pour-points of said oils.

Copolymers of styrene and isobutylene, and more generally copolymers of aliphatic olefins with polymerizable cyclic compounds, are disclosed in U. S. Patent 2,274,749. The general method of preparing such copolymers is also disclosed therein and consists essentially in carrying out the copolymerization of the mixed reactants at a temperature below 0° C., such as $-10°$ C., $-50°$ C., $-80°$ C., $-100°$ C., or even lower, in the presence of an active halide polymerization catalyst, and preferably in the presence of an inert, volatile organic liquid serving as solvent and refrigerant.

Instead of styrene, other polymerizable cyclic material may be used, such as alphamethyl styrene, paramethyl styrene, alphamethyl paramethyl styrene, indene, terpene, coumarone, dihydronaphthalene, etc., as well as copolymers of indene and coumarone.

Instead of isobutylene, other isoolefins may be used such as isoamylene, particularly methyl-2 butene-2, isooctylene, etc., as well as other aliphatic olefins such as propylene, normal butylene, etc.

For the purposes of the present invention, it is preferred to use the copolymers of relatively higher molecular weight such as are prepared by carrying out the copolymerization at a temperature below $-50$ C., and preferably using as polymerization catalyst aluminum chloride or other Friedel-Crafts catalyst already dissolved in a suitable solvent such as methyl chloride or ethyl chloride. The combination of the use of a dissolved catalyst and the very low temperature results in the formation of a copolymer of highest molecular weight, and consequently one which will have best viscosity index improving properties.

The proportions in which the styrene or other polymerizable cyclic material and the isobutylene or other alkene may be copolymerized, may vary over a wide range of about 10 to 90% by weight, but preferably about 15 to 40% by weight, of the cyclic material.

For convenience and brevity, the above-described copolymer of an aromatic polymerizable material and an olefin will be referred to as an aromalkene copolymer. The specific type of copolymer made from styrene and isobutylene will be similarly referred to for brevity as stybutene. The invention will be illustrated as applied particularly to stybutene, although it is not to be limited thereto.

The present invention comprises broadly the alkylation of these various copolymers which contain a reactive aromatic nucleus, by reacting them with long-chain olefins at or near room temperature or somewhat lower temperature, in the presence of an alkylation catalyst.

By the term "long-chain olefins" is intended to mean olefins having at least 10 carbon atoms, or those in the range of 10 to 30 carbon atoms, preferably about 15 to 20 carbon atoms, as for instance octadecene, cetene, etc., as well as either pure or mixed olefins derived by dehydrogenation, alone or with cracking, of paraffin wax, or other solid or liquid petroleum hydrocarbon fractions, or olefins formed by polymerization of lighter olefins such as those having from 2 to 8 or 10 carbon atoms, particularly propylene and isobutylene, or other synthetic olefins such as those produced in the Fischer synthesis process.

It should be noted that the products of the present invention are different from products obtained by simultaneous polymerization condensation of three reactants such as styrene, isobutylene, and cracked wax olefins, because in such a case, a substantial amount of the higher olefins enter into the formation of a linear chain or three-dimensional chain, in addition to mere alkylation of some of the aromatic nuclei present, whereas in the present process, a linear high molecular weight copolymer is first formed with only the styrene and lower alkene, and then only are the higher olefins added for the alkylation step.

The proportions to be used of the high molecular weight copolymer and the long-chain olefin used to alkylate it, may vary over a considerable range, but generally should be about 0.2 to 2.0, preferably about 0.5 to 1.0, parts by weight of the long-chain olefin for each one part by weight of the high molecular weight copolymer.

The temperature used for carrying out this alkylation reaction is critical in that if it is either too high or too low, active pour depressors, as desired in this invention, will not be obtained, even though products made at the higher and lower temperatures may be useful for some other purposes such as for improving the viscosity index of lubricating oils, or as modified resins or plastics. The alkylation temperature to be used according to the present invention should generally be between −50° C. and +40° C., and the best results are obtained in the preferred range of −20° C. to +25° C. Thus, the alkylation reaction can be carried out at ordinary room temperature, or at slightly reduced temperatures such as 0° C., obtained by cooling with ice, or at even slightly lower temperatures as may be readily obtained by cooling with a refrigerated salt brine, or by using liquefied methyl chloride as refrigerant (which boils at −23° C., therefore maintains that temperature).

As the high molecular weight copolymer used as one of the two chief reactants is a solid, the alkylation reaction is preferably carried out in the presence of a solvent for said copolymer, but one which is inert in the alkylation reaction per se. The suitability of the solvent may vary somewhat according to the alkylation temperature used. For instance at a temperature of +25° C., orthodichlorbenzene has been found very suitable, while at temperatures in the range of from +10° C. down to −20° C., ethyl chloride is suitable, while at still lower temperatures, methyl chloride can be used. Numerous other unreactive solvents, including other halogenated hydrocarbon solvents, would also be satisfactory.

The preferred alkylation catalyst is anhydrous aluminum chloride, added to the reaction mixture, either as a dry powder or in fine granular form, or preferably dissolved in a suitable solvent inert to the alkylation reaction, and preferably the same liquid as used as solvent for the reaction medium.

The alkylation reaction time will, of course, vary according to the particular temperature used and the concentration of catalyst and reactants, but normally will range from 1 to 50 hours, and preferably about 5 to 25 hours.

After the alkylation reaction has been completed, it is desirable to inactivate any remaining catalyst by adding a hydrolyzing agent such as water, or a low molecular weight alcohol, or an aqueous solution of an alcohol, or an aqueous solution of a caustic soda. Then, the alkylation reaction product may be separated from the resulting catalyst sludge, by settling, centrifuging, or other suitable means, and finally the desired reaction product, still dissolved in the solvent, may be washed with water, and either stored, shipped or used while still dissolved in the solvent, or may be recovered from the solvent solution by distillation or precipitation, as by addition of alcohol. Thus, a lower alcohol such as isopropyl alcohol, if not too much diluted with water, may serve simultaneously to hydrolyze the catalyst and precipitate the alkylated copolymer reaction product.

The product, made according to the above-described process of this invention, is a high molecular weight aromalkene copolymer having a 10 to 90%, preferably 15 to 40% by weight content of combined aromatic constituent, and having a molecular weight of at least 2000, preferably at least 10,000, which has been alkylated with a sufficient amount of long chain olefins to impart to the copolymer pour depressing properties as judged by the ASTM Pour Point Test on a lubricating oil containing .01 to 2.0% of the alkylated copolymer dissolved therein. For purposes of the present invention, an active pour depressor may be defined as one which is capable, when added in 1% by weight concentration to a highly paraffinic lubricating oil having an ASTM pour point of +20° F., of making a blend having an ASTM pour point at least as low as −15° F.

Thus, the alkylated copolymers of this invention are especially useful as wax modifiers for lowering or depressing the pour point of waxy mineral lubricating oils such as Pennsylvania lubricating oil, Mid-Continent oil, or other highly paraffinic lubricating oil base stocks. It may also be used to lower the pour point of other petroleum hydrocarbon fractions such as a paraffinic gas oil fraction, such as is used in gun-recoil oils, hydraulic fluids, etc., as well as in mineral oil greases containing various metal soaps, e. g., calcium stearate, aluminum naphthenate, sodium stearate, lithium soaps, lead soaps, etc. It may also be used in small concentrations to modify the crystal properties of ordinary paraffin wax.

The product of this invention may also be blended in vegetable or other fatty oils, such as linseed oil, cottonseed oil, soybean oil, paints, varnishes, lacquers and other coating compositions. They may be compounded with various fillers such as clay, carbon black, zinc oxides, sulfur, barium sulfate, calcium carbonate, calcium sulfate, titanium phosphate, titanium dioxide, as well as natural rubber or various synthetic rubbers, e. g., butadiene-styrene or isobutylene-diene copolymers or butadiene-acrylonitrile synthetic rubber or polychloroprene, or other high molecular weight polymeric materials such as polybutene, unalkylated styrene-isobutylene copolymers, polystyrene, polyethylene, polyacrylic esters, and various other resins and synthetic plastic materials. If desired, these alkylated copolymers may be dissolved in a volatile solvent such as naphtha, toluene, or other solvent, for use in spray coating or other purposes.

The objects, advantages and details of the invention will be better understood from a consideration of the following experimental data, particularly when read in conjunction with the accompanying drawing, marked Fig. 1, which is a chart on which are plotted graphically the ASTM pour point of 1% blends of various alkylated styrene-isobutylene copolymers in a paraffinic lubricating oil, the ASTM pour point (in degrees F.) being plotted against the alkylation temperature (in degrees C.) used in preparing the alkylated copolymers.

EXAMPLES 1, 2 AND 3

A copolymer of 30% by weight of styrene and 70% of isobutylene was made by copolymerizing these reactants in the presence of six volumes of methyl chloride as solvent, and in the presence of AlCl₃ as catalyst, at a copolymerization temperature of −75° C. This copolymer had an intrinsic viscosity of 0.8 in toluene, and an average molecular weight of about 26,000.

This copolymer was alkylated with octadecene (normal $C_{18}$ olefin), at five different alkylation temperatures, using in each case the same proportion of 7.2 parts by weight of the olefin to 10 parts by weight of the copolymer, and using about the same general amount of aluminum chloride as catalyst in each of the five cases, but using slightly different chlorinated hydrocarbon solvents, according to the alkylation temperatures used. The alkylated copolymer products were then recovered from the reaction mixtures and tested for pour depressing properties by adding ¼%, ½%, and 1% of each of the products to a paraffinic lubricating oil base stock to determine how much depressing or lowering of the pour point was obtained.

Of the five different alkylation temperatures used, the first one, namely +50° C., identified as run A, and the last one at —75° C., identified as run B, are outside of the scope of the present invention, and do not give products which are active pour depressors. The other three alkylation temperatures used were +25° C., +5° C. and —20° C., and are identified as Examples 1, 2 and 3 respectively. In each of the five runs, the alkylation reaction time was 20 hours. The three lower temperature reactions were quenched by the addition of the reaction mixtures to a large volume of isopropyl alcohol. The rubbery products were stirred with the alcohol, then dried on the hot rubber mill. The two higher temperature reactions were quenched by the addition of an isopropyl alcohol in benzene solution to the reaction mixture. The solutions were washed with water, then the solvent was removed on the steam bath.

The data on the alkylation reaction are given in Table I herebelow, and the data on the pour depressing test are given in Table II.

Table I

REACTION OF S-30 (30% STYRENE-70% ISOBUTYLENE COPOLYMER) WITH OCTADECENE

| Run | Temp. °C. | r. S-30 | g. C18 | Solvent | AlCl₃ and solvent [1] |
|---|---|---|---|---|---|
| A | +50 | 20 | 14.8 | 200 ml. O-C₆H₄Cl₂ | 2.8 g. in 100 ml. |
| Ex. 1 | +25 | 10 | 7.2 | 100 ml. O-C₆H₄Cl₂ | 2.0 g. solid. |
| Ex. 2 | +5 | 10 | 7.2 | 100 ml. C₂H₅Cl | 2.0 g. in 50 ml. |
| Ex. 3 | —20 | 10 | 7.2 | 100 ml. C₂H₅Cl | 2.0 g. in 50 ml. |
| B | —75 | 10 | 7.2 | 100 ml. CH₃Cl | 2.8 g. in 200 ml. |

[1] Same solvent for catalyst and S-30.

The products were tested for pour depressant activity in test oil Ck. 5401 (Baton Rouge 442 neutral plus 3.5% Pennsylvania bright stock) which has an ASTM pour point of +20°F. The results are given in Table II.

Table II

STYLENE-OCTADECENE ALKYLATE AS POUR DEPRESSANTS

| Run number | Temperature of alkylation, °C. | A. S. T. M. pour points, °F. at concentrations by weight indicated | | |
|---|---|---|---|---|
| | | ¼% | ½% | 1% |
| A | +50 | +15 | +20 | +15 |
| Ex. 1 | +25 | —25 | —30 | —30 |
| Ex. 2 | +5 | +15 | 0 | —15 |
| Ex. 3 | —20 | —10 | —25 | —30 |
| B | —75 | +20 | +20 | +20 |

The pour point data for the 1% blends are plotted graphically on the accompanying drawing marked Fig. I.

As shown in the last column in Table II and as shown graphically in Fig. 1, run A which was made at +50° C. and run B which was made at —75° C., both resulted in products which were inactive from a pour depressing point of view. On the other hand, the runs marked Examples 1 and 3 both gave products showing excellent pour depressing characteristics, in that 1% blends of these products reduced the pour point of the waxy mineral lubricating oil base stock from +20° F. to —30° F. The alkylation temperatures used in these two runs were +25° C. and —20° C. respectively, orthodichlorbenzene having been used as solvent at the +25° C. alkylation temperature, and ethyl chloride having been used as solvent at the —20° C. alkylation temperature because orthodichlorbenzene would not be suitable at that low temperature. The remaining one of the five tests, namely the one marked Example 2 which was made at an alkylation temperature of +5° C., using ethyl chloride as solvent, resulted in an alkylated copolymer which, in 1% concentration in waxy lube oil, reduced the pour point from +20° F. to —15° F. This shows substantial value as an active pour depressor, but it is not nearly as good as the products of Examples 1 and 3. The reason for these slightly less satisfactory results in Example 2 have not yet been ascertained.

Instead of using a single chlorinated hydrocarbon as solvent for the alkylation reaction, one may use mixtures of two or more chlorinated solvent, as for instance a mixture of orthodichlorbenzene and ethyl chloride.

EXAMPLE 4

A copolymer of 40% of styrene and 60% by weight of isobutylene was made at a temperature of —100° C., and had an intrinsic viscosity of 0.7 and an average molecular weight of about 22,000. Twenty grams of this copolymer and 15.8 grams of octadecene dissolved in orthodichlorbenzene were treated with 15 grams of solid anhydrous aluminum chloride, and the reaction was carried out at +20° C. for twenty hours. The resulting product gave ASTM pour points of —10° F., —15° F., and —20° F., at concentrations of ¼%, ½% and 1%, respectively when tested in the same paraffinic lubricating oil base stock used in Examples 1 to 3. The pour point data for the 1% blend of this copolymer is also shown graphically in Fig. 1 on the accompanying drawing, where it is evident that this particular alkylated copolymer is somewhat better than that of Example 2, but not quite as good as the alkylated copolymer of Examples 1 and 3.

Although the reasons for the surprisingly good results of this invention are not yet thoroughly understood, it is believed that by maintaining an alkylation reaction temperature in the moderate range, i. e., not letting it exceed 40° C. and preferably not over 25° C., that the desired alkylation reaction is permitted to proceed satisfactorily without being hindered or superseded by other undesired side reactions which it is believed take place at the higher temperatures such as 50° C.

It is not intended that this invention be limited to the specific examples which have been given merely for the sake of illustration, but only by the appended claims in which it is intended to claim all novelty in the invention as well as all modifications coming within the scope and spirit of the invention.

The pour point depressants made in accordance with this invention may be used in conjunction with other additives in oil. Thus they may be used in oils containing antioxidants, detergents, metal deactivators, oiliness agents, rust preventives, extreme pressure agents and improvers of viscosity index. It may also be advantageous to use them with other pour point depressants as adjuvants to prolong their effectiveness during long periods of storage at fluctuating temperatures.

We claim:

1. The process which comprises essentially alkylating with 0.2 to 2.0 parts by weight of octadecene, 1 part by weight of a copolymer of a polymerizable monoolefinic hydrocarbon containing an aromatic nucleus, and an alkene of 3 to 5 carbon atoms, said copolymer containing about 15 to 40% by weight of combined aromatic constituent and having an average molecular weight of at least 2,000, at a reaction temperature of −50° C. to +50° C.

2. Process according to claim 1 carried out in the presence of three to ten volumes of inert solvent per volume of mixed reactants.

3. Process according to claim 1 carried out in the presence of a Friedel-Crafts catalyst.

4. The process which consists essentially in alkylating with 0.2 to 2.0 parts by weight of octadecene, 1 part by weight of a copolymer of 15 to 40% by weight of styrene and 85 to 60% by weight of isobutylene having an average molecular weight of at least 2000, in the presence of an inert solvent, and in the presence of a Friedel-Crafts catalyst, at a temperature of −50° C. to +40° C.

5. The process which consists essentially in alkylating with octadecene, a copolymer of 15 to 40% by weight of styrene and 85 to 60% by weight of isobutylene, having an average molecular weight of at least 10,000, using 0.5 to 1.0 parts by weight of octadecene for each one part by weight of copolymer, in the presence of an inert chlorinated hydrocarbon solvent which is liquid at the alkylation temperature used, and in the presence of anhydrous aluminum chloride as alkylation catalyst, at a temperature of −25° C. to +25° C., for a reaction time of 5 to 25 hours.

6. The process which consists essentially in alkylating with octadecene a copolymer of 30% by weight of styrene and 70% of isobutylene having an intrinsic viscosity of about 0.8 and an average molecular weight of about 25,000, in the presence of an inert chlorinated hydrocarbon solvent which is liquid at the alkylating temperature used, and in the presence of anhydrous aluminum chloride as catalyst, at a temperature of about −25° C. to +25° C., using proportions of materials corresponding approximately to 10 grams of the styrene-isobutylene copolymer, 7.2 grams of octadecene, 100 ml. of the solvent, and 2.0 grams of AlCl₃.

7. Product consisting essentially of an alkylation product of 0.2 to 2.0 parts by weight of octadecene, with 1 part by weight of a copolymer of a polymerizable monoolefinic hydrocarbon containing an aromatic nucleus, and an alkene of 3 to 5 carbon atoms, said copolymer containing about 15 to 40% by weight of combined aromatic constituent, and having an average molecular weight of at least 2000, and having the property of depressing the pour point of waxy lubricating oils from at least as high as +20° F. to at least as low as −15° F. when added thereto in a concentration of 0.1 to 2.0% by weight.

8. Product consisting essentially of an alkylation product of 0.2 to 2.0 parts by weight of octadecene, with 1 part by weight of a copolymer of 15 to 40% by weight of styrene and 85% to 60% by weight of isobutylene, said copolymer having an average molecular weight of at least 10,000, and said alkylated copolymer being soluble in mineral lubricating oil, and having active pour depressing properties in waxy mineral lubricating oils.

9. Product consisting essentially of an alkylation product of 0.2 to 2.0 parts by weight of octadecene with 1 part by weight of a styrene-isobutylene copolymer containing 30% by weight of combined styrene, and having an average molecular weight of at least 10,000, said octadecylated styrene-isobutylene copolymer being soluble in mineral lubricating oil and having the property of depressing the pour point of waxy lubricating oils from at least as high as +20° F. to at least as low as −15° F. when added thereto in a concentration of .01 to 2.0% by weight.

10. A composition comprising a major proportion of a petroleum hydrocarbon fraction and a minor proportion of an alkylation product of 0.2 to 2.0 parts by weight of octadecene, with 1 part by weight of a copolymer of a polymerizable monoolefinic hydrocarbon containing an aromatic nucleus, and an alkene of 3 to 5 carbon atoms, said copolymer containing about 15 to 40% by weight of combined aromatic constituent, and having an average molecular weight of at least 2000.

11. Composition comprising a major proportion of a waxy mineral lubricating oil having an A. S. T. M. pour point at least as high as +20° F. containing dissolved therein a pour depressing amount of an alkylation product of 0.5 to 1.0 parts by weight of octadecene with 1 part by weight of a styrene-isobutylene copolymer containing 30% by weight of combined styrene and having an average molecular weight of at least 10,000, said blended oil composition having an A. S. T. M. pour point at least as low as −15° F.

12. Composition according to claim 11 having an A. S. T. M. pour point at least as low as −30° F.

13. The process which consists essentially in alkylating with about 0.5 to 1.0 part by weight of octadecene, 1 part by weight of a copolymer of 30 to 40% by weight of styrene and 70 to 60% by weight of isobutylene having an average molecular weight of about 22,000 to 26,000, in the presence of an inert solvent, and in the presence of a Friedel-Crafts catalyst, at a temperature of −50° C. to +5° C. for a reaction time of about 5 to 25 hours.

14. The process which consists essentially in alkylating with octadecene a copolymer of 30% by weight of styrene and 70% of isobutylene having an intrinsic viscosity of about 0.8 and an average molecular weight of about 25,000, in the presence of ethyl chloride as solvent, and in the presence of a catalyst consisting of two grams of aluminum chloride dissolved in 50 ml. of ethyl chloride, at a temperature of −20° C., using proportions of materials corresponding approximately to 10 grams of the styrene-isobutylene copolymer, 7.2 grams of octadecene, 100 ml. of the ethyl chloride solvent, and 2.0 grams of aluminum chloride, for a reaction time of about 20 hours.

15. A composition comprising 98% to 99.5% by weight of a waxy mineral lubricating oil having an A. S. T. M. pour point at least as high as +20° F., containing dissolved therein 0.5% to 2.0% by weight of an alkylation product of about 0.7 parts by weight of octadecene with 1 part by weight of a styrene-isobutylene copolymer containing 30% by weight of combined styrene and having an average molecular weight of about 25,000, said blended oil composition having an A. S. T. M. pour point at least as low as −25° F.

16. Product consisting essentially of an alkylation product of 0.2 to 2.0 parts by weight of octadecene with 1 part by weight of a styrene-isobutylene copolymer containing 30 to 40% by weight of combined styrene, and having an average molecular weight of at least 10,000, said alkylated styrene-isobutylene copolymer being soluble in mineral lubricating oil and having the property of depressing the pour point of waxy lubricating oils from at least as high as +20° F. to at least as low as −15° F. when added thereto in a concentration of .01 to 2.0% by weight.

WILLIAM C. HOLLYDAY, JR.
MARVIN H. MAHAN.

References Cited in the file of this patent

UNITED STATES PATENTS

| Number | Name | Date |
|---|---|---|
| 2,072,120 | Mikeska | Mar. 2, 1937 |
| 2,197,835 | Reiff | Apr. 23, 1940 |
| 2,274,749 | Smyers | Mar. 3, 1942 |
| 2,472,495 | Sparks | June 7, 1949 |
| 2,493,217 | Berger | Jan. 3, 1950 |

OTHER REFERENCES

Cunningham: Rubber Age, pages 187–190, November (1947).